United States Patent
Boström et al.

(10) Patent No.: US 10,163,341 B2
(45) Date of Patent: Dec. 25, 2018

(54) DOUBLE STEREOSCOPIC SENSOR

(71) Applicant: Kapsch TrafficCom AB, Jönköping (SE)

(72) Inventors: Göran Boström, Huskvarna (SE); Björn Crona, Jönköping (SE)

(73) Assignee: Kapsch TrafficCom AB, Jönköping (SE)

( * ) Notice: Subject to any disclaimer, the term of this patent is extended or adjusted under 35 U.S.C. 154(b) by 49 days.

(21) Appl. No.: 15/529,941

(22) PCT Filed: Nov. 27, 2015

(86) PCT No.: PCT/EP2015/077865
§ 371 (c)(1),
(2) Date: May 25, 2017

(87) PCT Pub. No.: WO2016/083554
PCT Pub. Date: Jun. 2, 2016

(65) Prior Publication Data
US 2017/0330453 A1    Nov. 16, 2017

(30) Foreign Application Priority Data
Nov. 27, 2014  (EP) ..................................... 14195254

(51) Int. Cl.
*G06T 7/20*    (2017.01)
*G08G 1/04*    (2006.01)
(Continued)

(52) U.S. Cl.
CPC ........... *G08G 1/04* (2013.01); *G06K 9/00771* (2013.01); *G06T 7/593* (2017.01); *G08G 1/015* (2013.01);
(Continued)

(58) Field of Classification Search
None
See application file for complete search history.

(56) References Cited

U.S. PATENT DOCUMENTS

| | | | |
|---|---|---|---|
| 2014/0204205 A1* | 7/2014 | Kotz .................. | G01B 11/0608 348/142 |
| 2016/0241839 A1* | 8/2016 | Crona ...................... | G08G 1/04 |

(Continued)

FOREIGN PATENT DOCUMENTS

| | | |
|---|---|---|
| EP | 1067388 A1 | 1/2001 |
| EP | 3026652 A1 | 6/2016 |

(Continued)

OTHER PUBLICATIONS

International Search Report and Written Opinion received for PCT Patent Application No. PCT/EP2015/077865, dated Mar. 10, 2016, 12 pages.

(Continued)

*Primary Examiner* — Brent Swarthout
(74) *Attorney, Agent, or Firm* — Piala & Weaver P.L.L.C.

(57) ABSTRACT

The present disclosure relates to a stereoscopic sensor comprising: a first camera pair for capturing a first and a second image wherein the stereoscopic sensor is adapted to monitor and define a main surveillance zone in a surveillance plane at a predetermined distance from the stereoscopic sensor, said main surveillance zone comprising a first and a second surveillance zone and the first camera pair defines a first surveillance zone with a primary coverage in a first direction and a secondary coverage in a second direction wherein the stereoscopic sensor further comprises a second camera pair for capturing a first and a second image, said images being processable into a height image.

17 Claims, 6 Drawing Sheets

Figure 1A:
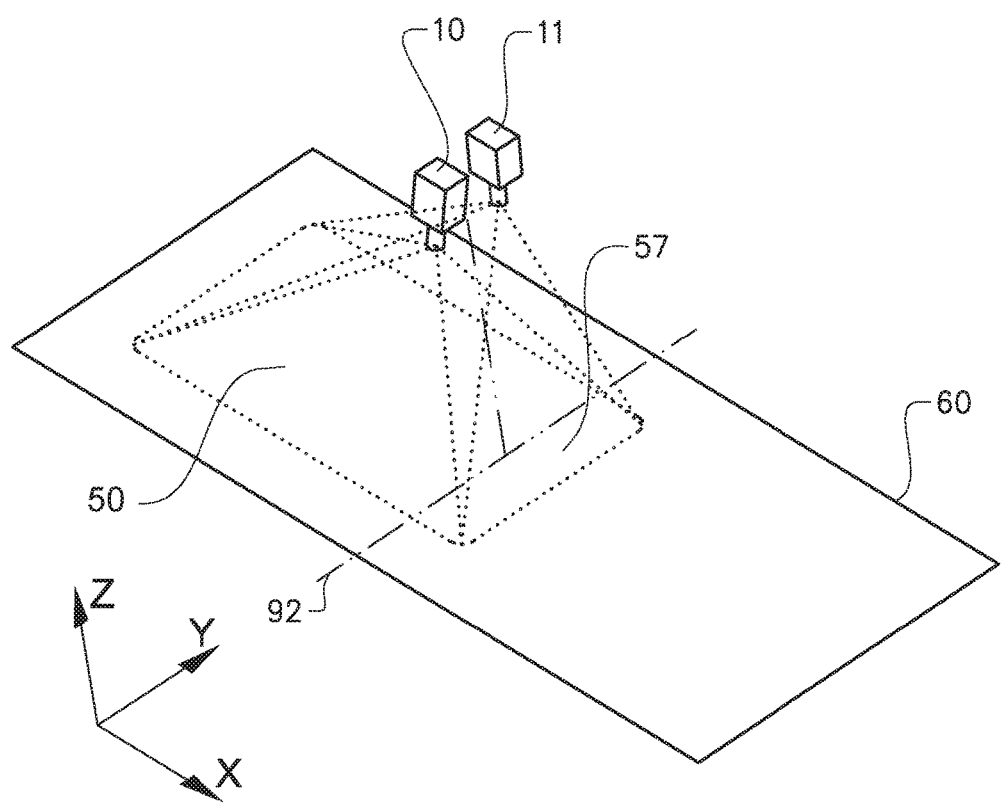

(51) Int. Cl.
G06T 7/593 (2017.01)
G08G 1/015 (2006.01)
G06K 9/00 (2006.01)

(52) U.S. Cl.
CPC ............... *G06K 2209/23* (2013.01); *G06T 2207/30236* (2013.01)

(56) References Cited

U.S. PATENT DOCUMENTS

2016/0247398 A1* 8/2016 Carlsson .............. G08G 1/04
2017/0330454 A1* 11/2017 Backvall .............. G08G 1/04

FOREIGN PATENT DOCUMENTS

| JP | 2000207678 A | 7/2000 |
| JP | 2012103919 A | 5/2012 |
| WO | 2009/029051 A1 | 3/2009 |
| WO | 2016/083554 A1 | 6/2016 |

OTHER PUBLICATIONS

International Preliminary Report on Patentability received for PCT Patent Application No. PCT/EP2015/077865, dated Mar. 13, 2017, 8 pages.
Office Action received for Canadian Patent Application No. 2,967,872, dated Mar. 14, 2018, 4 pages.

* cited by examiner

DOUBLE STEREOSCOPIC SENSOR

CROSS-REFERENCE TO RELATED APPLICATION(S)

This application is a U.S. national phase of International Application No. PCT/EP2015/077865 filed Nov. 27, 2015, which designates the U.S. and claims priority to European Patent Application No. 14195254.9 filed Nov. 27, 2014, the disclosures of which are herein incorporated by reference in their entireties.

BACKGROUND

Technical Field

The present disclosure relates to a stereoscopic sensor for capturing height images of a monitored area. The disclosure also relates to a system and a method for such stereoscopic sensors. The present disclosure may be used in any surveillance field, and is advantageously applied to traffic surveillance or road toll collection.

Background Art

Surveillance systems are used around the world for various purposes. Such purposes include traffic surveillance and road toll collection. Traffic surveillance may be used for e.g. gathering statistics on how much a road is used, identify traffic patterns or to determine unauthorised vehicles, for instance in the case of warning a truck of an upcoming tunnel or bridge with low clearance. Road toll collection can be used to fund privately owned or public roads and road projects, or to provide an incentive for carpooling or using other routes to reduce emissions or traffic congestion in an area. For both of these systems, it may be important to be able to determine different types of vehicles e.g. to be able to issue alerts to or to use a different toll charge for only larger vehicles. As part of traffic surveillance or road toll systems, it is vital to achieve a high degree of reliability, e.g. it is important that the system does not misinterpret the size of the vehicle, confuse shadows with the actual vehicle or one vehicle with another.

BRIEF SUMMARY

To achieve more accurate or reliable surveillance, some traffic systems employ various techniques to improve the accuracy of the system. One such technique is the use of stereoscopic cameras or sensors. A stereoscopic sensor comprises of a first and a second camera spaced apart. Both cameras are directed such, that they have a capturing area covering essentially the same area segment, i.e. the by the stereoscopic sensor monitored area segment. The cameras of a stereoscopic sensor can be arranged to measure distance. The distance may be measured as the camera as a reference point, or from a defined reference plane. The cameras of the stereoscopic sensor are calibrated such that they have a surveillance plane, which is aligned with the monitored area segment, whereby the surveillance plane indicates a zero plane, and height/depth are measured with the surveillance plane as a zero plane. The stereoscopic sensor uses its first and second camera to capture a first and second image respectively, of the monitored area segment, the first and second camera pair are capturing their images simultaneously. Any object that are in the surveillance plane, such as a shadow on a road, will have the same position in an image from the first camera and an image from the second camera. Any object that are located below or above the surveillance plane (such as point of a vehicle upon the road) will have a slightly different position in an image from the first camera than in an image from the second camera of the stereoscopic sensor, this difference is due to the different angles the cameras have in relation to the object.

By using this technology a height/depth image/map (from now on only referred to as height image) can be created of the monitored area segment by using the difference in position of an object in the two images. The further away an object or part of an object is from the surveillance plane, the greater will the difference in position be in the two images. A height image can be created from the difference in position in the two images. The height image may comprise only information about measured heights above a surveillance plane, and may be processed such that object boundaries are disclosed in the height image.

Stereoscopic sensors and systems with stereoscopic systems are used to monitor traffic, especially in critical situations such as a toll gantry or toll plaza. Stereoscopic sensors and systems therewith can be applied in other applications, such as monitor shopping malls, parking lots, air fields and any other places where a height image of the monitored area is of advantage. The stereoscopic sensors can capture single images or be used to capture film sequences. The information in a height image can be used for height measurement, positioning and classification of objects such as e.g. vehicles, airplanes, persons and any other moving or static object depending on application.

It is an object of this disclosure to present a stereoscopic sensor, which is able to cover large areas combined with a high accuracy.

The stereoscopic sensor comprises a first camera pair for capturing a first and a second image, i.e. a first image pair, said images being processable into a height image. The stereoscopic sensor is adapted to monitor and define a main surveillance zone in a surveillance plane at a predetermined distance from the stereoscopic sensor. The surveillance plane extends in a direction X and a direction Y. The first camera pair defines a first surveillance zone with a primary coverage in a first direction from a projected mounting position of the stereoscopic sensor and a secondary coverage in a second direction from the projected mounting position. The projected mounting position is defined as a position along the direction X of the surveillance plane. The first and second directions are oppositely directed. That is, the projected mounting position is a position in the surveillance plane above which the stereoscopic sensor is provided. Typically, in this context, the term "above" refers to a direction Z being perpendicular relative to the direction X and the direction Y.

The stereoscopic sensor further comprises a second camera pair for capturing a first and a second image, i.e. a second image pair, said images being processable into a height image. The second camera pair defines a second surveillance zone with a primary coverage in the surveillance plane in the second direction from the projected mounting position and a secondary coverage in the first direction from the projected mounting position. The secondary coverage of the first and the second camera pairs overlap the primary coverage of the other camera pair respectively.

The disclosed stereoscopic sensor provided with a first and a second camera pair as defined, enables a larger surveillance area, and thereby still keeping the stereoscopic sensor as close to the monitored area as possible. Normally for a camera to cover a larger area, it must be provided further away from the area covered or be provided with a wide angle lens.

Further, the two camera pairs and their set up allows an overlapping area, i.e. an area covered by both the first and the second camera, and thereby covered by four cameras. A set up of the stereoscopic sensor with a first and a second camera pair such that it is provided with an overlapping area allows for the stereoscopic sensor to have improved accuracy of data in the overlapping area, due to the double coverage. The improved accuracy can be used to detect tow bars of a truck with a trailer, in order to correctly identify the vehicle as a truck and a trailer and not two separate vehicles. Normally, such detection can be problematic, due to that the tow bar is a relatively small object, close to the ground and a high accuracy must be provided in order to make a correct detection. Further, the two bar is only visible for the stereoscopic sensor directly beneath the sensor, due to its position far down in a small space between the truck and the trailer, whereby from other angles than essentially directly from above, the view upon the tow bar is blocked by the truck and the trailer. The high accuracy in the overlapping area further brings the exemplary effects of more precise volumetric (height, width and length), speed and distance measurements and false height pixels are avoided. In an exemplary embodiment two vehicles travelling close to each other, for example during a traffic congestion, can be correctly identified as separate vehicles.

As before, it should be noted that the use of the stereoscopic sensor is not necessarily limited to the use of surveillance on a road section, but can be used for other surveillance purposes as well. However, the stereoscopic sensor is particularly suitable for monitoring traffic and traffic situations.

In one exemplary embodiment, the projected mounting position in the surveillance area is provided directly below the stereoscopic sensor, whereby an exemplary advantage is that the stereoscopic sensors overlapping area will be provided where the stereoscopic sensor monitors objects directly from above. In this context, the wording "directly below" refers to a direction perpendicular to the surveillance zone.

Thus, in one example embodiment, the projected mounting position essentially corresponds to a position of a region of the overlap, as seen in the direction X.

According to an exemplary embodiment of the stereoscopic sensor, the overlap area comprises about 10% of the whole main surveillance zone. In other exemplary embodiments, the overlap area can may be larger, such as 15%, 20%, 25% or 30% of the surveillance zone, or smaller such as 5% of the surveillance zone. The size of the overlap area is a compromise with the size of the main surveillance zone, which becomes smaller with a larger overlap area with the same distance between the stereoscopic sensor and the surveillance plane.

In one example embodiment, each one of the camera pairs is directed towards the surveillance plane with an angle being different than an angle of an imaginary line perpendicular arranged to the surveillance plane.

Typically, the first direction and the second direction extends in opposite directions from the projected mounting position.

In other words, by the example embodiments of the disclosure, the overlap of the coverage of the two camera pairs extend past the projecting mounting position, as seen in the direction X. This increases the resolution in the areas directly below the cameras. The projecting mounting position may typically, although not strictly necessarily correspond to the middle point of the surveillance area.

According to some exemplary embodiments of the stereoscopic sensor, the stereoscopic sensor is provided with an electronic control unit and is adapted to process images captured by the first and second camera pairs to produce a height image. An exemplary effect of this is that a height image sent from the stereoscopic sensor may have a much smaller size without losing any information, in comparison if each individual image would be send from the stereoscopic sensor.

Typically, the control unit is configured to combine a first height image, being processed from images from the first camera pair, and a second height image, being processed from images from the second camera pair, into one combined height image, whereby said combined height image comprises the overlapping area.

Another object is achieved by a system for surveillance, whereby the system for surveillance is provided with at least one of the above disclosed embodiments of the stereoscopic sensor. The surveillance system further comprises a central system including an electronic control unit. The central system may be provided with an internal memory and/or storage device and/or communication device and/or the electronic control unit mentioned and/or an additional electronic control unit, in order to perform diverse tasks such as communicating results on a network to a law enforcement agency or to store data in a database for statistical, surveillance or road tolling purposes, perform processing on the images and may be used for process the captured images into height images. The devices of the central system may be arranged locally in the proximity of the stereoscopic sensor be physically attached thereto or be arranged at a remote position from the stereoscopic sensor. The central system can also be divided into one or several local and remote devices.

In one exemplary embodiment of the surveillance system, it may be equipped with one or a plurality of additional stereoscopic sensors. This gives the exemplary effect that the surveillance system can monitor a plurality of main surveillance zones, i.e. the case of traffic surveillance or road toll surveillance, the system may monitor each road lane independently by directing each stereoscopic sensor to a respective lane on the road.

According to exemplary embodiments of the surveillance system, the stereoscopic sensor is mounted on a gantry and draws the surveillance plane on a road surface below the gantry.

Typically, the stereoscopic sensor is arranged at the predetermined distance essentially perpendicular from the overlap region, as seen in the direction Z.

Another object is achieved by a method for controlling a surveillance system according to any one of the exemplary embodiments disclosed above. In the method, the control unit controls the system to capturing a first and a second image with the first camera pair, processing the first and second images from the first camera pair to produce a first height image, capturing a first and a second image with the second camera pair, processing the first and second images from the second camera pair to produce a second height image, and combining the first and second height images into one combined height image disclosing both the first surveillance area and the second surveillance area, whereby in the overlapping area an average value of the first and second height images is used. All the four images (first and second image from respective camera pair), which are processed into a height image are captured simultaneously in order to create the height image.

An exemplary effect by the disclosed method is by combining the first and second height images from respective camera pair into a combined height image, a height image of the whole main surveillance zone can be achieved despite the use of two separate camera pairs monitoring different first and second surveillance zones. An additional exemplary effect is achieved by averaging the value of the first and second height images in the overlapping area of the height image, whereby the overlapping area will become a higher accuracy.

According to some exemplary embodiments of the method the control unit further controls the system to; detecting a pixel having a height corresponding to said surveillance plane in the first height image in the overlapping area, comparing the height in a pixel, corresponding to the detected pixel, in the second height image in the overlapping area, and adjusting the height in said second height image to the surveillance plane if the pixel in the second height image is classified with a height above the surveillance plane. An exemplary effect this exemplary embodiment is that a pixel that incorrectly is defined with a height in a first height image can be corrected with the other image.

According to some embodiments of the method, the control unit further controls the system to: sending the first and second image pair from the stereoscopic sensor to the central system, and wherein the central system is processing the first and the second image pairs to a respective height image. An exemplary effect of this working order is that the height images are produced at a centralized location, whereby the individual sensor must not be provided with image processing means capable to perform an the processes of combining the individual images to one height image.

According to some exemplary embodiment of the method, the first and second image pairs may be compressed before being sent to the central system. An exemplary effect of this is that a lower bandwidth is needed in the communication with the central system.

According to some exemplary embodiments of the present application, the stereoscopic sensor may process the first and second image pairs into corresponding height images, and subsequently combine the height images into a combined height image, which is then send to the central system. An exemplary effect of processing the images already in the stereoscopic sensor is that the height image can be send to the central system with much lower resolution, without any loss of information. To process the individual images from the respective camera pair, into a height image, the images must be in relative high resolution; in order have a reliable height measurement. Hence, if the images are send directly to the central system the images must have a relative high resolution and further from each sensor must 4 of these images be send. When a height image have been obtained, this can be compressed without the height information is compromised, whereby just one image (the height image) may be send from each stereoscopic sensor, containing the same information as four ordinary larger images, if all four images were send.

The term "height image" generally refers to an image in which each pixel has an associated height value. The height image is e.g. an image disclosing heights above the road of the road section covered by the stereoscopic camera. In this type of application, the height value is zero for the ground level, i.e. the road level. However, in some cases, the height value is set to zero also for uncertain values relating to obscure pixels. Thus, in some examples, the process of identifying heights in the height image may include the step of associating obscure pixels with a height value of zero.

The height image is created by combining the information from the first image, captured by the first camera of the stereoscopic camera, and the second image, captured by the second camera of the stereoscopic camera.

In other words, in the context of the present application, a "height image" is an image comprising information from the first and the second images, and in which each pixel in the height image has an associated height value. A height attribute specifies the height of an image, in pixels.

In addition, a height image from one stereoscopic camera may be aligned, or combined, with a height image from another stereoscopic camera to form a combined height image, as the coordinates of a height image are aligned and thus typically synchronized with each other. Thus, one height image from one stereoscopic camera and another height image from another stereoscopic camera may form a combined height image.

Typically, although not strictly necessary, height calculations are conducted from information in the combined height image.

The process of calculating the heights from the first and the second image is a commonly known method, and is thus not further described herein.

Further exemplary embodiments and effect of the device, system and method are disclosed in the following description and in the drawings.

BRIEF DESCRIPTION OF THE DRAWINGS/FIGURES

Figure 2A:
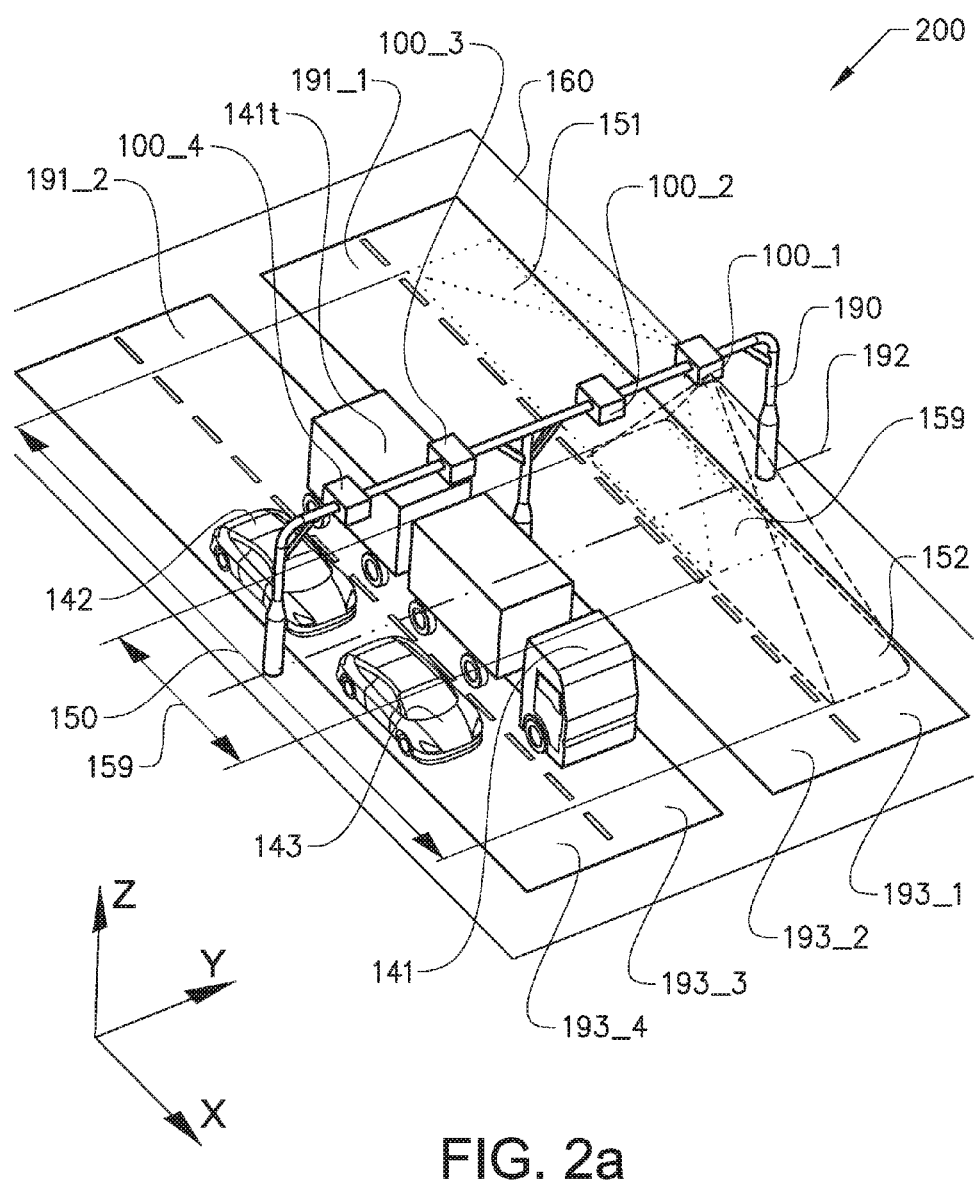
Figure 2B:
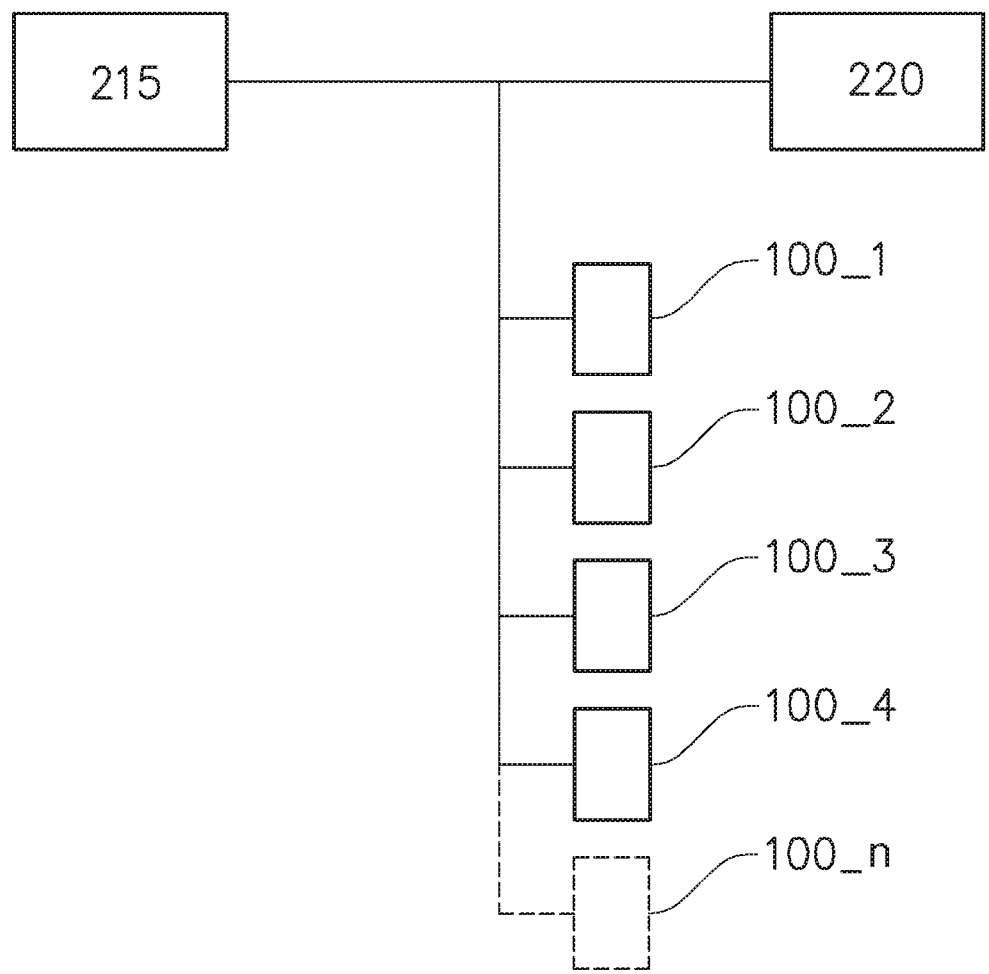
Figure 2C:
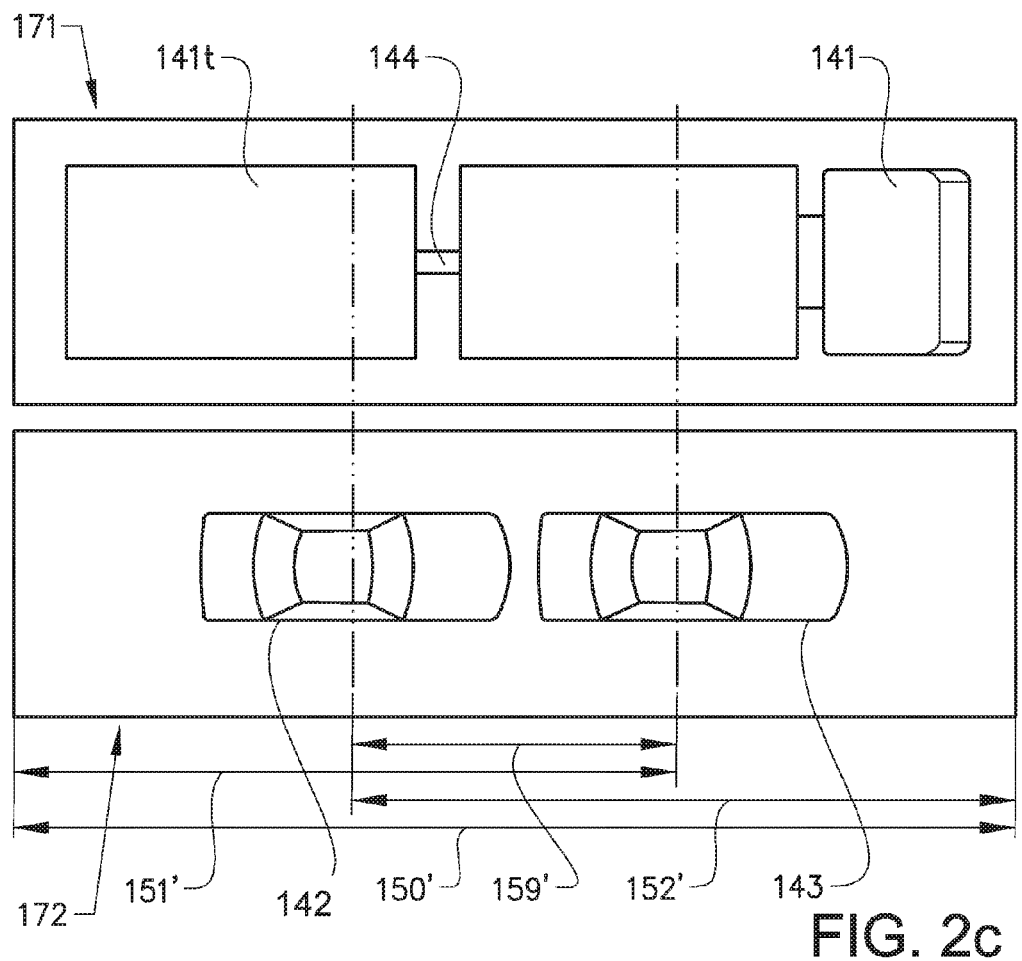
Figures 3A, 3B, 3C:
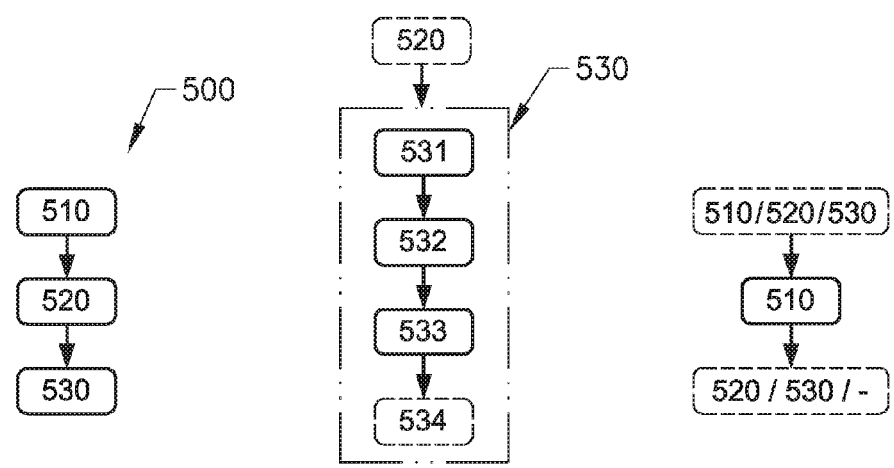

The various example embodiments, including their particular features and example advantages, will be readily understood from the following illustrative and non-limiting detailed description and the accompanying drawings, in which:

FIG. 1a-e shows schematic views of a stereoscopic sensor,

FIG. 2a-b shows a schematic views of a surveillance system,

FIG. 2c shows a schematic view of a height image,

FIG. 3a-b shows a flowcharts of exemplary embodiments of the method.

DETAILED DESCRIPTION

With reference to the appended drawings, below follows a more detailed description of exemplary embodiments of the device, system and method.

FIG. 1 a discloses a schematic view of a stereoscopic camera pair 10, 11, which stereoscopic sensor camera pair 10, 11 is adapted to define a surveillance zone 51 in a surveillance plane 60. The stereoscopic camera pair 10, 11 comprises a first and a second camera 10, 11, which are adapted to capture images of the surveillance plane 60. The surveillance plane 60 extends in an X- and a Y-direction and the stereoscopic camera pair 10, 11 are provided with a distance to the surveillance plane 60 in the Z-direction in the figure, whereby the X- Y- and Z-directions are orthogonal to each other. The stereoscopic camera pair 10, 11 has a projected mounting position 92 in the surveillance plan 60. The arrangement of the stereoscopic camera pair 10, 11 in FIG. 1a can be considered as a standard set up of a stereoscopic camera pair 10, 11.

The cameras 10, 11 are calibrated such that they define the surveillance plane 60, whereby the surveillance plane 60 indicates a zero plane, and height/depth are measured with the surveillance plane 60 as a zero plane. The first and second camera 10, 11 captures their images simultaneously. Any object that is in the surveillance plane 60, such as a shadow on a road, will have the same position in an image from the first camera 10 and an image from the second camera 11. Any object or part of an object that are located below or above the surveillance plane 60 (such as part of a vehicle upon the road) will have a slightly different position in an image from the first camera 10 than in an image from the second camera 11 of the stereoscopic sensor. This difference is due to the different angles the cameras 10, 11 have in relation to the surveillance plane 60 and to the object.

FIG. 1*b-e* discloses schematic views of an exemplary embodiment of a stereoscopic sensor 100, which stereoscopic sensor 100 is adapted to define a main surveillance zone 150 (disclosed in FIGS. 1*d* and *e*) in a surveillance plane 160. The surveillance plane 160 corresponds to the surveillance plane 60 disclosed in FIG. 1*a*. The stereoscopic sensor 100 comprises a first and a second camera pair 110, 120. Each camera pair 110, 120 correspond to the camera pair 10, 11 disclosed in FIG. 1*a*. The first and second camera pairs 110, 120 each define respective first and second surveillance zones 151, 152 in a surveillance plane 160. The surveillance plane 160 extends in the plane defined by the x- and the y-axis in the figures. The stereoscopic sensor 100 is located a predetermined distance D above the surveillance plane 160 in the direction of the z-axis in the figures.

Figure 1B:
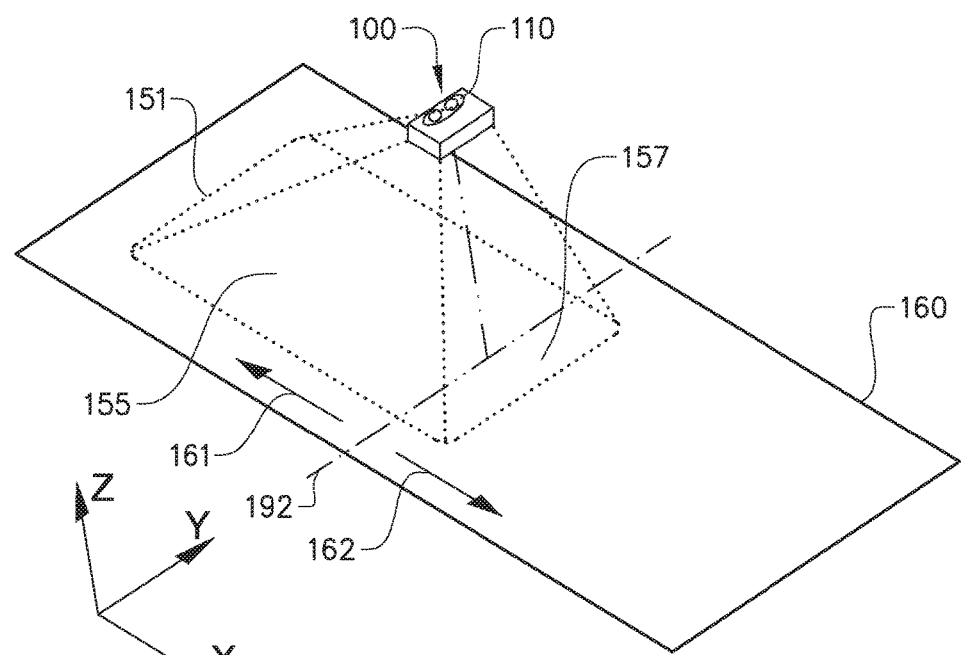
Figure 1C:
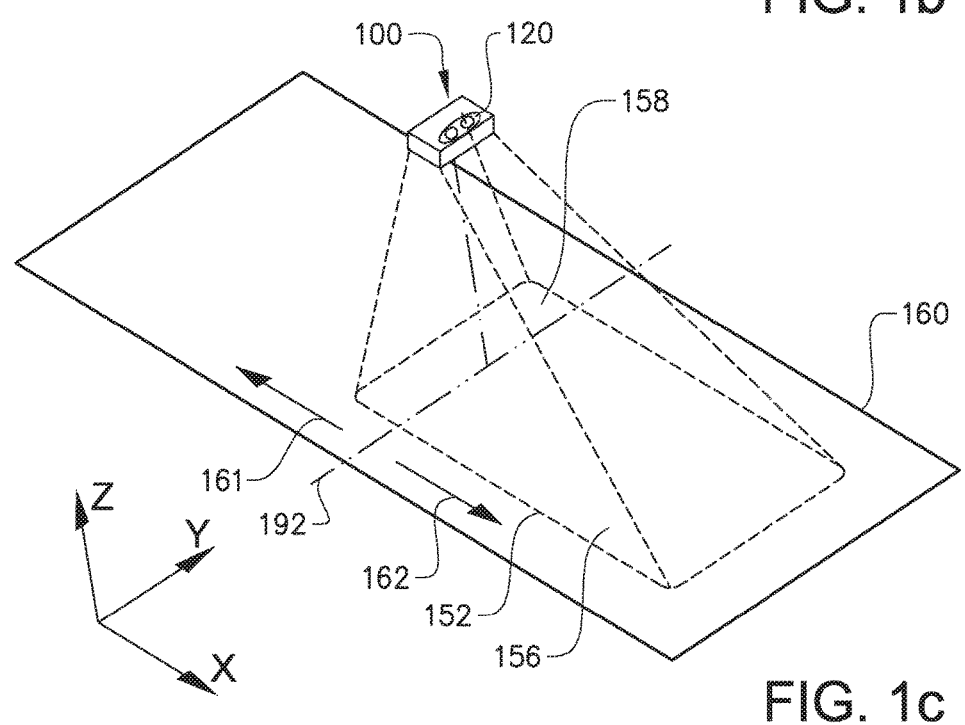
Figure 1D:
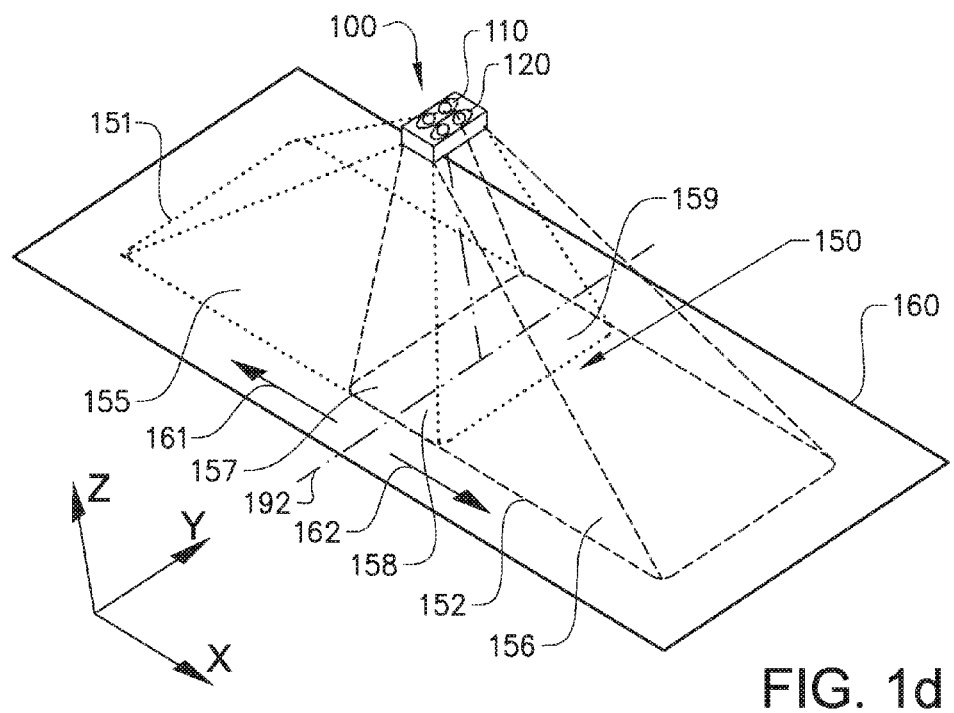
Figure 1E:
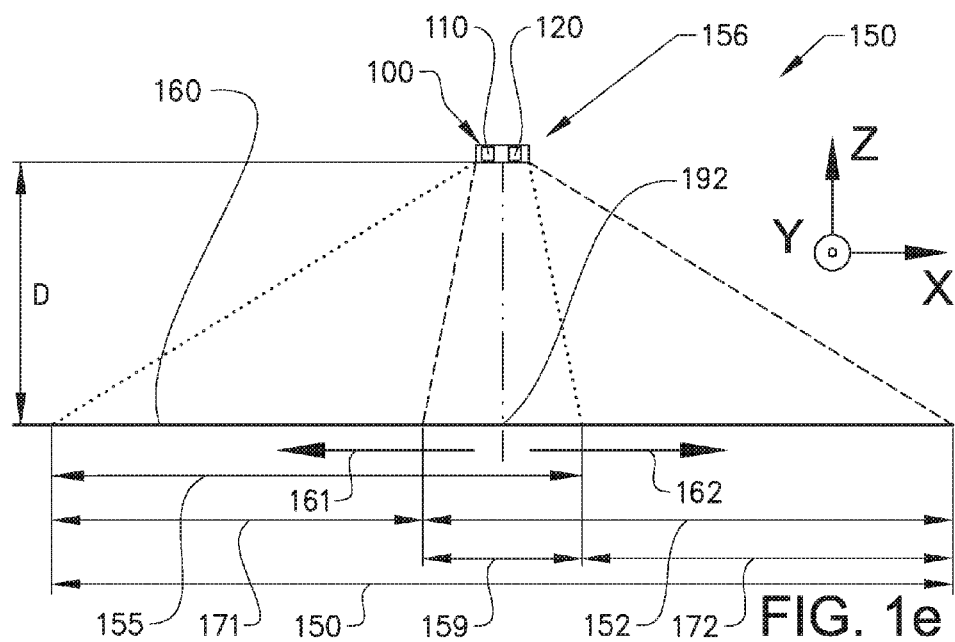

FIG. 1*b* shows the first surveillance zone 151, defined by the first camera pair 110. FIG. 1*c* shows the second surveillance zone 152, defined by the second camera pair 120. In FIG. 1*d* and FIG. 1*e* the first, the second and the main surveillance zones 151, 152, 150 are disclosed.

The surveillance plane 160 acts as the reference plane when combining images captured by the camera pairs 110, 120 to produce height images 170. Thus, a point determined to be in the surveillance plane 160 has a height of 0, a point above the surveillance plane 160 has a positive height equal to the difference in height between the point and the surveillance plane 160, and a negative height if below the surveillance plane 160. When the stereoscopic sensor 100 is arranged to monitor a section of road, the sensor 100 is arranged such that it defines surveillance plane 160 in level with and aligned with the road surface 191, whereby the sensors 100 height D above the surveillance plane 160 is equal to the sensors height above the road surface 191.

As mentioned herein, the first camera pair 110 is configured for capturing a first and a second images, said images being processable into a height image. Analogously, the second camera pair 120 is configured for capturing a first and a second images, said images being processable into a height image.

The stereoscopic sensor 100 is provided at a mounting position 192 at a predetermined distance D from the surveillance plane 160. The stereoscopic sensor 100 has a projected mounting position 192 in the surveillance plane 160. The projected mounting position 192 is defined as a position in the X-direction, disclosed as a line 192 in FIG. 1*a-e* and FIG. 2*a*. The first and second camera pairs 110, 120 are directed towards the surveillance plane 160 at an angle.

By way of an example, each one of the camera pairs 110, 120 is directed towards the surveillance plane 160 with an angle being different than an angle of an imaginary line perpendicular arranged to the surveillance plane 160. By way of example, the angle of any one of the camera pairs may deviates from the imaginary line by about 2-40 degrees, for example, 4-30 degrees, or 5-10 degrees.

A first and a second direction 161, 162 are defined (disclosed as arrows 161, 162), both running along the x-axis in opposite directions from the projected mounting position 192. The first camera pair 110 is directed in the first direction 161, and the second camera pair 120 is directed in the second direction 158 opposite the first direction 162.

In other words, the first direction 161 and the second direction 162 extends in opposite directions from the projected mounting position 192.

The first camera pair 110 of the stereoscopic sensor 100 defines the first surveillance zone 151 in the surveillance plane 160. The first surveillance zone 151 extends in the surveillance plane 160 in the first and second directions 161, 162 from the projected mounting position 192. The first surveillance zone 151 has a primary coverage 155 and a secondary coverage 157. The first coverage 155 is defined as the part of the first surveillance zone 151 extending in the first direction 161. The secondary coverage 157 is defined as the part of the first surveillance zone 151 extending in the second direction 162.

The projected mounting position is here defined as a position along the direction X of said surveillance plane 160. Thus, the second camera pair 120 of the stereoscopic sensor 100 defines the second surveillance zone 152 in the surveillance plane 160. The second surveillance zone 152 extends in the surveillance plane 160 in the first and second directions 161, 162 from the projected mounting position 192. The second surveillance zone 152 has a primary coverage 156 is defined as the part of the second surveillance zone 152 extending the second direction 162. The secondary coverage 158 is defined as the part of the second surveillance zone 152 extending in the first direction 161.

FIG. 1*c* shows a schematic view of the exemplary embodiment of the stereoscopic sensor 100 and disclosing the main surveillance zone 150, which is defined as the combined surveillance area of the first and the second surveillance zone 151, 152.

FIG. 1*d* shows a schematic side view of the exemplary embodiment of the stereoscopic sensor 100 and disclosing main surveillance zone 150 in the surveillance plane 160.

The main surveillance zone 150 is provided with three main areas in the surveillance plane 160 the first end area 171, defined by that it is only covered by the first surveillance zone 151, the second end area 172, defined by that it is only covered by the second surveillance zone 152 and the overlap area 159, which is defined by that the overlap area 159 is covered by both the first and the second surveillance zone 151, 152 of the stereoscopic sensor 100.

Typically, as seen in the figures, the projected mounting position essentially corresponds to a position of a region of the overlap 159 as seen in the direction X. In other words, the stereoscopic sensor is arranged at the predetermined distance D essentially perpendicular from the overlap region, as seen in a direction Z.

An exemplary set of the stereoscopic sensor 100 is such that the camera pairs 110, 120 are directed at the surveillance plane 160 at an angle relative said surveillance plane 160 in the first and second directions 156, 158 respectively, such that the main surveillance zone 150 extends essentially the same distance in both the first and the second direction 161, 162.

An exemplary set up of the stereoscopic sensor 100 is that it is mounted at about 6.5 meters above the surveillance plane 160 to define a main surveillance zone 150 symmetrically below the stereoscopic sensor 100. Each camera pairs 110, 120 are provided with a viewing angle such that the desired main surveillance zone 150 and overlap area 159 is achieved. Exemplary lengths of the main surveillance zone 150 in a road surveillance facility are 25, 30, 35 or 40 meters. The length of the main surveillance zone is however not bound to the specific exemplary lengths. Exemplary lengths for an overlap area 159 is about 2, 3, 4, or 5 meters, depending on the length of the main surveillance zone 150 and the purpose of the surveillance. In an exemplary embodiment, the overlap area 159 is located directly beneath the stereoscopic sensor 100 and in the middle of the main surveillance zone 150. The overlap area may in other exemplary embodiments be located with a greater area in the first direction 161, 162 then in the second direction or other way around. These exemplary set ups may be used when the stereoscopic sensor 100-100_1-100_n are provided to monitor a road, for example for toll collection or monitoring of traffic behavior. Exemplary effects achieved with this and similar setups are; a low mounting height of the stereoscopic sensor 100, a wide main surveillance zone 150, highly reliable measurements in the overlapping area and the possibility to monitor traffic from both directions with the same sensor. A low mounting height have also the exemplary effect that number plate cameras for both front and rear number plates may be mounted on the same gantry as the stereoscopic sensor 100, 100_1-100_n. The advantages are not bound to the specific measures in the exemplary embodiment, which measures can be varied in order to enhance one or several effects, depending of desired application.

The overlap area 159 which is present in all embodiments of the stereoscopic sensor 100 gives the stereoscopic sensor 100 the exemplary effect of an increased reliability and higher accuracy in the overlap area, due to that information from two stereoscopic camera pairs 110, 120 is used in the height image over the overlap area 159.

In FIG. 2a an exemplary embodiment of a system 200 for surveillance is provided with four stereoscopic sensors 100_1-100_4, which corresponds to the stereoscopic sensor 100 disclosed in FIG. 1b-e. The system 200 is provided for surveillance of traffic on a road, for example for tolling purposes or traffic behavior surveillance. The stereoscopic sensors 100_1-100_4 are arranged upon a gantry 190 such that the surveillance plane 160 is aligned with the surface 191_1, 191_2 of a four lane road 193_1-193_4. The stereoscopic sensors 100_1, 100_2, 100_3, 100_4 are arranged above a respective road lane 193_1-193_4. The stereoscopic sensors 100_1-100_4 defines a first, the second and the main surveillance zone 151, 152, 150 upon respective lane 193_1-193_4 and thereby also the overlap area 159. The surveillance areas 151, 152, 150, 159 are however only disclosed in one lane 113_1 of the road to identify their position. The surveillance areas 151, 152, 150, 159 are however positioned correspondently in the other three lanes 193_2-193_4.

In FIG. 2b the exemplary embodiment of a system 200 for surveillance is disclosed in a schematically overview. The system 200 is provided with four stereoscopic sensors 100_1-100_4, but can be provided with any number n of stereoscopic sensors 100_1-100_n. The actual number of stereoscopic sensors 100_n is adapted to the surveillance area of interest, a larger area is normally in need of a larger number of stereoscopic sensors 100_1-100_n. In the disclosed exemplary embodiment of road surveillance, each stereoscopic sensor 100_n monitors one lane, whereby the number of stereoscopic sensors correspond the number of lanes 113_1-113_n upon a road. The stereoscopic sensor 100, 100_1-100_n may however also be arranged to monitor several lanes or with a plurality of sensors 100, 100_1-100_n to monitor one or a part of a lane. An exemplary effect of one sensor 100, 100_1-100_n covering several lanes is that fewer stereoscopic sensors 100, 100_1-100_n can be used to monitor the same road area as if each stereoscopic sensor 100, 100_1-100_n are designated for each lane 113_1-113_n.

In the schematically overview of the system 200 for road surveillance, a control unit 215 and a central system 220 is disclosed. The central system 220 may comprise device and functions like storing devices, processing devices and communication devices. The central system 220 may be locally arranged in the proximity of the stereoscopic sensor 100_1-100_n or be arranged at a remote location. The communication between the stereoscopic sensors 100_1-100_n, the control unit 215 and the central system may be wired or wireless, depending on circumstances and preferences of the system provider/operator. The central system 220 may also be provided with a communication link in order to access a database, a server or a law enforcement agency to communicate data. The data communicated could be e.g. traffic surveillance statistics, toll related data or raw data.

The control unit 215 can be distributed or a central control unit 215. A distributed control unit 215 may be distributed with one component (i.e. control unit) in each stereoscopic sensor 100_1-100_n and one in the central system 220, in order to perform image processing and other processing tasks related to the respective stereoscopic sensor 100_1-100_n or central system 220. Alternatively, the system may be provided with only one control unit 215, which controls the processes of the whole system. Further, the system 200 may be provided with any variation of distributed and centralised control unit 215 with a maintained functionality.

It is to be noted that the control unit may be part of the stereoscopic sensor or a separate part of the system connected to the sensor. Hence, in all example embodiments, the stereoscopic sensor 100, 100_1-100_n may be provided with the control unit 215, which is adapted to process images captured by the first and second camera pairs 110, 120 to produce a height image 170. In addition, the control unit is typically configured to combine a first height image, being processed from images from the first camera pair, and a second height image, being processed from images from the second camera pair, into one combined height image 171, 172. Hereby, the combined height image comprises the overlapping area 159.

In FIG. 2a an exemplary traffic situation with three vehicles 141, 142, 143 is disclosed in the two road lanes 193_3 and 193_4 located beneath stereoscopic sensors 100_3, 100_4. The three vehicles 141, 142, 143 are two cars 142, 143 and one truck 141 with a trailer 141t. The vehicles 141, 142, 143 are monitored by the stereoscopic sensors 100_3 and 100_4.

FIG. 2c discloses two combined height images 171, 172 put together from the images captured by the stereoscopic cameras 100_3, 100_4 in FIG. 2a. In the height image 171, 172 in FIG. 2c, the overlap area 159 is disclosed as 159' and the main surveillance zone 150 is disclosed as 150' and the first surveillance zone 151 is disclosed as 151' and the second surveillance zone 152 is disclosed as 152'. The stereoscopic sensors 100_1-100_n produce height images used either separately or combined (as in FIG. 2c) into a combined height image 171, 172 to determine attributes of the vehicles 141, 142, 143. These attributes may include height, position, size, classification, distance between other vehicles and velocity. In the height images 171, 172 of FIG. 2c, only objects provided with a height over the surveillance plane 160 are disclosed, i.e. shadows and/or road markings are not provided in the height images 171, 172. The objects with a height are the truck 141 and its trailer 141t and the two cars 142, 143.

Now, some exemplary effects of the stereoscopic sensor 100, 100_1-100_n will be explained with help of FIG. 2c. In the example, the cars 142, 143 are driving close to each other, as in traffic congestion. Due to the high resolution in the overlap area 159' in the height images 171, 172, it is possible to identify that the two cars 142, 143 are two separate cars and not one object. Further, the high resolution in the overlap area 159' in the height images 171, 172 enables an identifying of the tow bar 144 between the truck 141 and its trailer 141', instead of identifying the truck 141 and the trailer 141' as two separate vehicles or one long vehicle, which could be the case without the high resolution from the stereoscopic sensor 100, 100_1-100_n presented in this disclosure.

FIG. 3a-3c discloses exemplary embodiments of the method to control a surveillance system 200. In FIG. 3a a basic version of the method 500 is disclosed.

FIG. 3a discloses a basic method comprising of three method steps 510, 520, 530. First step; the control unit 215 controls the stereoscopic sensors 100_1-100_n to capture first and second image pairs with their respective first and second camera pairs 110, 120. Second step 520; the images are thereafter processed into a respective height image of respective camera pair's surveillance zone 151, 152. Third step 530; the control unit 215 combines the respective height image into one combined height image 171, 172 disclosing the whole surveillance zone 150.

It is understood that a combined height image 171, 172 can comprise information from one or a plurality of stereoscopic cameras 100_1-100_n. The combined height image 171, 172 does however always comprise an overlap area 159' in which the information from two camera pairs 110, 120 have been combined to create a height measurement with an even higher accuracy. It is further understood that the method is performed continuously in order to achieve a sequence of images, and thereby a video surveillance of the monitored area.

The example embodiment of the method 500 can be provided with additional sub-steps which can be made in different order, depending on what effects that is desirable.

In one exemplary embodiment of the method 500, the method step 530 of combining the first and the second height image, comprises three sub-method steps 531, 532, 533. Method step 531 comprises detecting a pixel in height corresponding to the surveillance plane 160 in the overlapping area in one of the first and second height image 151', 152. Method step of 532 comprises comparing the height of a corresponding pixel in the other of the first and the second height image 151', 152'. Method step 533 comprises adjusting the height in the other of the first and the second height image 151', 152' to the surveillance plane 160, if the pixel in the second height image 170 is detected to with a height above the surveillance plane 160.

An exemplary effect of adding these method steps 531, 532, 533 is that pixels in one height image, that falsely have been determined as having a height, is found and corrected.

The method step 530 can additionally or as an alternative to method steps 531, 532, 533 comprise a method step 534, in which an average value of the detected heights in respective first and second height image 151' 152' are used in the overlapping area 159' of the combined height image 171, 172. This gives the exemplary effect of a more precise height measurement or combined height image 171, 172.

A method step 610 of sending information from the stereoscopic sensors 100_1-100_n to the central system 220 can be in some exemplary embodiments of the method provided between method step 510 and 520 or between method step 520 and 530 or after method step 540. In a first exemplary embodiment of the method 500, the method step 610 of sending information is performed after the images from the camera pairs 110, 120 are captured, whereby the captured raw images are sent to the central system 220. An exemplary effect of sending the raw images directly is that the stereoscopic sensor 100_1-100_n only have to capture images and no image processing has to be performed by a control unit 215 of the stereoscopic sensors 100_1-100_n. By compressing the images before sending those to the central system 220 bandwidth can be saved in the communication. In another exemplary embodiment of the method 500, the images 151', 152' the method step 610 of sending the central system is performed between method step 520 and method step 530 or after method step 530. By performing the sending of information from the stereoscopic sensors 100_1-100_n later in the method 500, an exemplary effect of reducing the bandwidth is achieved. Another exemplary effect of processing the images into height images locally already in the stereoscopic sensors 100_1-100_n, is that it makes it possible to use many sensors to one central system or use sensors with higher resolution since the amount of data to be sent, and to be processed by the central system 220 this without losing any information.

The data send to from the stereoscopic sensors 100_1-100_n can be sent in either an un-compressed or a compressed format. By compressing the data bandwidth can be saved during the communication. Independently of when in the method 500 the data is communicated to the central system 220, the data can be compressed.

The invention claimed is:
1. A stereoscopic sensor comprising:
a first camera pair for capturing a first and second image, wherein the stereoscopic sensor is adapted to monitor and define a main surveillance zone in a surveillance plane at a predetermined distance from the stereoscopic sensor, said main surveillance zone comprising a first and a second surveillance zone, and
the first camera pair defines the first surveillance zone with a primary coverage in a first direction and a secondary coverage in a second direction, wherein the stereoscopic sensor further comprises a second camera pair for capturing a first and a second image, said images being processable into a height image, wherein the coverage of the second camera pair defines the second surveillance zone with a primary coverage in the surveillance plane in the second direction and a secondary coverage in the first direction,
wherein said secondary coverage of the first and the second camera pairs overlap the primary coverage of the other camera pair respectively, wherein said stereoscopic sensor is arranged above said overlap.
2. The stereoscopic sensor according to claim 1, wherein said overlap comprises about 10-30% of the primary coverage.
3. The stereoscopic sensor according to claim 1, wherein said surveillance plane comprises a projected mounting position that corresponds to a position of a region of the overlap as seen in a direction X.
4. The stereoscopic sensor according to claim 1, wherein each one of the camera pairs is directed towards the sur- veillance plane with an angle being different than an angle of an imaginary line perpendicular arranged to the surveillance plane.

5. The stereoscopic sensor according to claim 1, wherein the first direction and the second direction extend in opposite directions from a projected mounting position in said surveillance plane.

6. The stereoscopic sensor according to claim 1, wherein said stereoscopic sensor is provided with a control unit and is adapted to process images captured by the first and second camera pairs to produce the height image.

7. The stereoscopic sensor according to claim 6, wherein the control unit is configured to combine a first height image, being processed from images from the first camera pair, and a second height image, being processed from images from the second camera pair, into one combined height image, whereby said combined height image comprises the overlapping area.

8. A system for surveillance comprising:
a stereoscopic sensor; and
a central system including a central control unit,
said stereoscopic sensor comprising:
a first camera pair for capturing a first and a second image wherein the stereoscopic sensor is adapted to monitor and define a main surveillance zone in a surveillance plane at a predetermined distance from the stereoscopic sensor, said main surveillance zone comprising a first and a second surveillance zone and the first camera pair defines the first surveillance zone with a primary coverage in a first direction and a secondary coverage in a second direction wherein the stereoscopic sensor further comprises a second camera pair for capturing a first and a second image, said images being processable into a height image, wherein the coverage of the second camera pair defines the second surveillance zone with a primary coverage in the surveillance plane in the second direction and a secondary coverage in the first direction, wherein said secondary coverage of the first and the second camera pairs overlap the primary coverage of the other camera pair respectively, wherein said stereoscopic sensor is arranged above said overlap.

9. The system according to claim 8, wherein said system further comprises one or more additional stereoscopic sensors.

10. The system according to claim 8, wherein the stereoscopic sensor is mounted upon a gantry and defines the surveillance plane upon a road surface below the gantry.

11. The system according to claim 10, wherein the stereoscopic sensor is arranged at the predetermined distance perpendicular from the overlap region.

12. A method for controlling a system comprising at least one stereoscopic sensor and a central system including a central control unit that performs the method to control the system, the method comprising:
capturing a first and a second image with the first camera pair, the first camera pair included in the at least one stereoscopic sensor and configured for capturing a first and a second image, wherein the stereoscopic sensor is adapted to monitor and define a main surveillance zone in a surveillance plane at a predetermined distance from the stereoscopic sensor, said main surveillance zone comprising a first and a second surveillance zone, wherein the first camera pair defines the first surveillance zone with a primary coverage in a first direction and a secondary coverage in a second direction, wherein the stereoscopic sensor further comprises a second camera pair configured for capturing a first and a second image, said images being processable into a height image, wherein the coverage of the second camera pair defines the second surveillance zone with a primary coverage in the surveillance plane in the second direction and a secondary coverage in the first direction, wherein said secondary coverage of the first and the second camera pairs overlap the primary coverage of the other camera pair respectively, wherein said stereoscopic sensor is arranged above said overlap,
capturing a first and a second image with the second camera pair, and
processing said first and second images from the first and second camera pair into a combined height image disclosing both said first surveillance zone and said second surveillance zone, wherein an average value of said first and second height images is used in an overlapping area.

13. The method according to claim 12, the method further comprising:
detecting a pixel having a height corresponding to said surveillance plane in the first height image in the overlapping area,
comparing the height in a pixel, corresponding to the detected pixel, in the second height image in the overlapping area, and
adjusting the height in said second height image to the surveillance plane in response to the pixel in the second height image being classified with a height above the surveillance plane.

14. The method according to claim 12, the method further comprising:
sending the first and second image pairs from the stereoscopic sensor to the central system, wherein the central system processes the first and the second image pairs to a respective height image.

15. The method according to claim 12, the method further comprising:
compressing the first and the second image pairs, and thereafter
sending the first and second image pairs to the central system, wherein the first and second image pairs are compressed such that they become a higher resolution in the overlapping area.

16. The method according to claim 12, the method further comprising:
processing the first and second image pairs into a respective height image;
sending the first and the second height images to the central system.

17. The method according to claim 12, the method further comprising:
processing the first and second image pairs into a respective height image;
processing the first and second height images into a combined height image, and thereafter
sending the combined height image to the central system.

* * * * *